Patented Apr. 22, 1930

1,755,379

UNITED STATES PATENT OFFICE

HENRY W. BANKS, 3D, OF NOROTON, CONNECTICUT, ASSIGNOR, BY MESNE ASSIGNMENTS, TO UNITED STATES RUBBER COMPANY, A CORPORATION OF NEW JERSEY

PROCESS OF CONCENTRATING LATEX

No Drawing.   Application filed November 28, 1924.   Serial No. 752,813.

This invention relates to a method of treating rubber latex.

A general object of the invention is to purify and at the same time concentrate and thicken rubber latex without coagulation of the same.

The invention consists broadly in mixing small quantities of colloidal materials with the latex and permitting the mixture to stand. I have found in the course of experimenting that when a mixture of this nature has been allowed to stand a few days a separation of the mixture into two distinct layers will be found to have taken place. The lowermost layer will be found to contain a relatively high concentration of water soluble substances naturally occurring in rubber latex and with almost no trace of rubber. On the other hand the uppermost layer will consist of a milky and thickened liquid which contains a very high concentration of rubber.

The colloidal substances which I have found best adapted for this useful purpose are of the type which are known to form highly viscous solutions in water, and to exhibit when sufficiently concentrated a contiguity of structure such as is found in jellies. For example, I have used a solution of gelatin for the purpose with the result that a dark lower layer substantially free from rubber was formed, upon which was superposed a milky and purified body of rubber latex. In other words, the gums, resins and the like which had naturally occurred in the rubber latex were separated out in the dark lower layer of the solution, thereby leaving the rubber latex in the upper layer substantially free from such impurities.

The invention is not confined to the use of gelatin. I have found that other colloidal materials produce results that are similar to but in most cases not as effective as the results obtained by the use of gelatin. Substances that may be used for this purpose include gum arabic, partially hydralized gelatin, glue of various types and vegetable protein such as is extracted from linseed.

I have found rubber latex concentrated in the method described produces rubber films possessing a high degree of transparency. This factor is due to the decreased concentration of non-rubber constituents of the latex. Such concentrated latex may be usefully applied in the production of dipped goods for the reason that relatively thick transparent films may be obtained with a single dipping operation. In the ordinary practice with latex as heretofore used in the production of dipped goods, the high degree of fluidity of the latex limited the dipping operation to the production of only thin films.

If a greater degree of purification and concentration of the latex is desired than is obtained in a single colloid-treating and settling operation, the operation may be repeated, thereby increasing both the purity of the latex and the transparency of the resulting film.

I have found that temperature conditions effect the separating process in the settling operation. A favorable temperature for separation of the materials is substantially 30° C. A period of settling of eighteen hours following warming of the solution to 30° C. has produced an effective subdivision of the solution into different layers.

What I claim is:—

A process for treating aqueous dispersions of rubber which consists in repeatedly increasing the state of aggregation of the rubber particles therein and alternately removing water-soluble material therefrom.

In testimony whereof I affix my signature.

HENRY W. BANKS, 3D.